March 11, 1941.　　　J. S. STEELE, JR　　　2,234,205
LIGHTNING PROTECTIVE SYSTEM
Filed Aug. 31, 1938
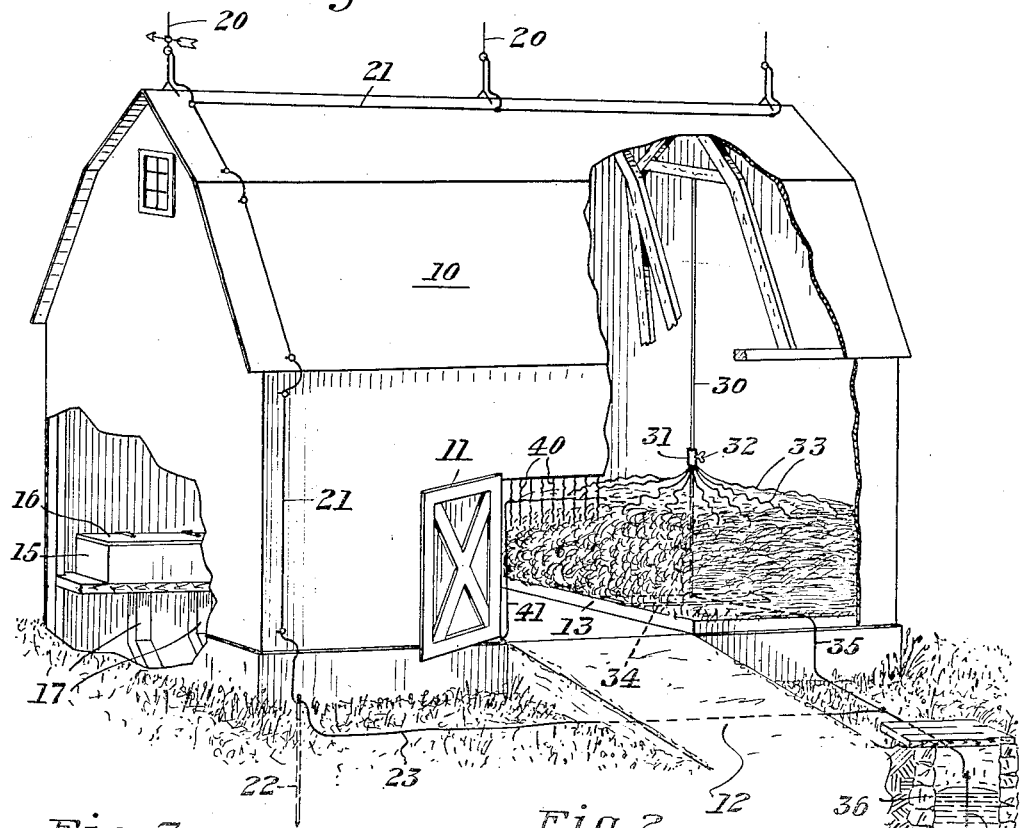
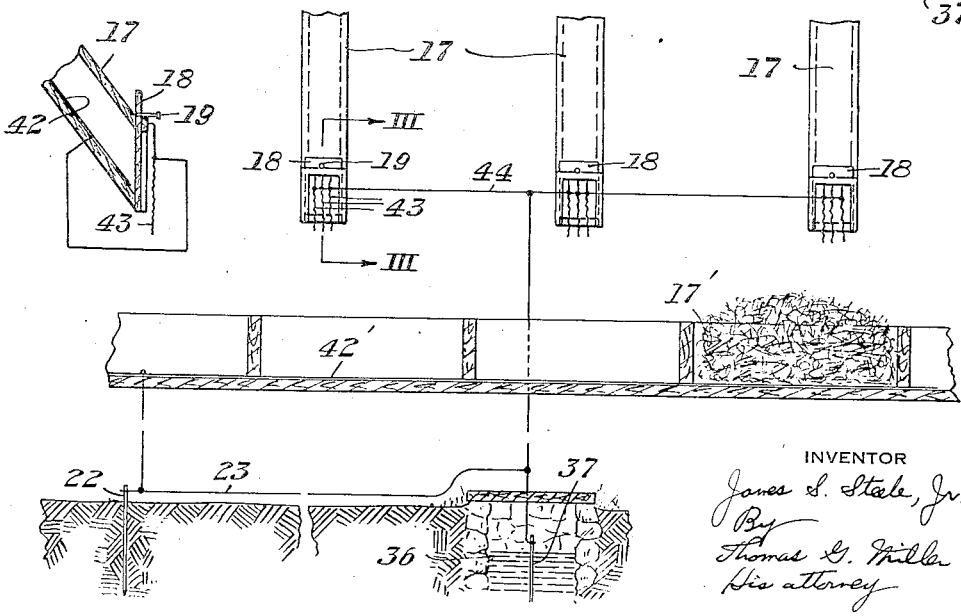
INVENTOR
James S. Steele, Jr.
By
Thomas G. Miller
His attorney Patented Mar. 11, 1941

2,234,205

UNITED STATES PATENT OFFICE 2,234,205

LIGHTNING PROTECTIVE SYSTEM

James S. Steele, Jr., Sturgeon, Pa.

Application August 31, 1938, Serial No. 227,701

8 Claims. (Cl. 174—2)

This invention pertains to an improved system for protecting buildings, etc., from lightning, and more particularly, to a system for discharging static electricity that is present or has accumulated and that thus constitutes a fire and/or lightning hazard.

Previous to the present invention, it has been customary, particularly in the farming districts, to provide barns and other buildings with a suitable externally applied lightning-arrestor system. From actual experience, I have found that very little reliance is placed upon such a system because there is no definite assurance of lightning protection in an electrical storm. Being well acquainted with the theory of an ordinary lightning arrestor system, I set out to discover why such systems were uncertain and generally unsatisfactory as far as a definite assurance was concerned. I was considerably surprised to find that there is a greater tendency for lightning to strike a barn, for example, within a short period after the hay and other grain has been stored therein. From experiments, I definitely determined that a stack of hay and a bin of grain have an appreciable charge of static electricity, due to the friction of stacking, hauling and handling, and particularly, due to the handling necessary to remove the hay or other grain from the field and place it in a barn or bin. In fact, after a period of time, I found that a stack of hay was not only charged with a relatively heavy charge of static electricity accumulated from a large number of small charges carried by the various loads or portions thereof, but that the charge, in effect, also charged dry timbers and other supporting structure of the framework of the building. After a time, of course, the charge or a portion thereof may leak to the ground and the danger of lightning thus lessened, until the time when a new load of grain, straw, hay, etc., is carried into the storage building.

I also was impressed by my discovery that an electrical charge of considerable magnitude may exist between an ordinary type of ground rod and the lightning arrestor system connected thereto; this, of course, means that such a ground is inefficient and will not act to discharge electricity unless the backed-up charge is large enough. I have found in many cases that the backed-up charge is enough to attract lightning.

And, it has been an object of my invention to provide an improved form of lightning prevention system;

Another object of my invention has been to devise a a new, practical and more efficient form of discharge system or apparatus for electrical charges;

A further object of my invention has been to solve the problems above enumerated and to develop a system which will constitute a practical solution of such problems.

These and many other objects of my invention will appear to those skilled in the art from the drawing, the description, and the appended claims.

In the drawing:

Figure 1 is a perspective view in elevation of a barn partly broken away showing a lightning protecting and electrical charge discharging system constructed and applied in accordance with the principles of my invention;

Figure 2 is a diagrammatic view showing grain chutes and a feed trough of a barn and suitable connections for an arrangement of the system of my invention; and Figure 3 is a sectional view in elevation taken along the line III—III of Figure 2.

In Figure 1, I have designated a barn by the numeral 10 that has swinging doors 11, a driveway 12, one or more hay platforms or storage floors 13, a grain bin 15, and grain chutes 17 feeding to feed stalls 17' in the cellar.

The bin 15 is preferably provided with a hinge lid 16 and the feed chutes 17 are provided with a suitable vertical slide door 18 having a nail 19 for lifting it to permit the grain to feed therefrom.

Although there is less need for an ordinary form of lightning arrestor system where the system of my invention is employed, for the purpose of illustration, I have shown an ordinary system that comprises lightning arrestor rods 20 and connecting cables 21 which are grounded by a rod 22 driven into the soil In carrying out the present invention, I find it advisable to provide a "natural" ground for my system and if an ordinary lightning system is employed, to also connect it to the "natural" ground. The so-called "natural" ground that I have in mind is one provided by making electrical connection with a body of water such as a natural body that is always wet, or in other words, that is always in electrical connection with underground streams, etc.

For the purpose of illustration, I have shown an upright standard device comprising a vertical rod 30, a floor conductor plate 34, a slide bracket 31 having a suitable positioning thumbscrew 32, and outwardly-projecting preferably somewhat flexible conduit or apron or screen-like wire portions 33. The load of hay is normally taken into the barn by driving a wagon or other vehicle up the incline 12 and through the open doorway. To preliminarily remove the electricity collected by the load and the wagon, I provide a downwardly depending series of electrically connected conductor wires of relatively flexible apron construction 40 which are connected by a conductor 41 with the ground system. The hay or other material is then piled on the conductor plate of metal 34 and after the loading has been completed, the clamp 31 is lowered so that the conductor fingers 33 press against the upper or top portion of the stack.

I have also found, as above explained, that static was present in the feed bins 15, chutes 17, and feed stalls 17'. For this reason, I preferably provide a suitable conductor plate 42 and 42' along the length of the lower face of the feed bins 15, chutes 17, and feed stalls 17', and may also provide suitable downwardly dangling relatively flexible conductor apron portions 43 in front of the feed chute. Both conductors 42, 42' and 43 are suitably connected to the ground lead by a conductor 44, see particularly Figure 2. The conductor plates 42, 42' are preferably of screen-like material, but solid plates may be used if desired.

I provide a "natural" ground, for example, by inserting a rod 37 in a well 36. The conductor portions of my system are thus connected by main lead 35 to this "natural" ground. I have found that in such a type of arrangement there is no appreciable potential difference between any points of the connected system and the ground 36. This is true even though it may be necessary to extend the main conductor 35 a considerable distance to reach a natural ground such as a well. As shown particularly in Figures 1 and 2, I also preferably connect a driven ground 22 by a lead 23 with a natural ground 36. In this manner, a voltage differential is prevented as far as the ordinary lightning arrestor system is concerned.

The driven rod 22 serves to discharge sudden and heavy charges while the supplementary or auxiliary line 23 prevents the building up of a voltage differential and provides a positive insurance of a discharge of small voltages or electrical charges that are accumulated by the lightning arrestor system.

Although for the purposes of illustration, I have particularly shown my invention as applied to a barn, it will be apparent that it is equally applicable to homes, grain elevators, and other places or buildings where static or undesired types of electricity are accumulated or built up, for example, by reason of frictional activity. I have also found that a system of the type described herein is a positive insurance against lightning since there is no electricity in the structure which, in effect, attracts the lightning. The arrangement also is valuable from the standpoint of fire protection in that it is well known that the static electricity will produce a definite spark when jumping across a gap.

Although as explained above, I have shown a preferred form of my invention for the purpose of illustration, it will be apparent to those skilled in the art that many other suitable arrangements, modifications, additions, and/or subtractions can be made without departing from the spirit and scope of the invention as indicated by the appended claims.

I claim:

1. In a system for discharging lightning-attracting electrical charges from relatively solid materials such as grain, hay, or straw to be stored in a building such as a barn, a conductor element interposed in the path of movement of materials being introduced into the barn and arranged to make electrical contact with such materials as they are being introduced into the barn, a ground, and a conductor connecting said conductor element to said ground.

2. In a system as defined in claim 1 wherein said conductor element is an apron suspended from a passageway into the barn.

3. In a system for discharging lightning attracting electrical charges from relatively solid materials such as grain, hay, or straw, stored in a building such as a barn, a floor conductor plate adapted to be positioned adjacent a portion of the barn upon which a stack of hay or straw is to be placed, means extending upwardly from said floor plate, means having adjustable portions associated therewith for electrically contacting an upper portion of the stack regardless of the size or height of such stack, a ground, and a conductor connecting both of said means to said ground.

4. In a system for discharging lightning-attracting electrical charges from relatively solid materials such as grain, hay, or straw to be stored in a building such as a barn, conductor means interposed in the path of movement of the materials being introduced into the barn and arranged to make electrical contact with such materials as they are being introduced, and additional conductor means adapted to make electrical contact with such solid materials after they have been stored in the barn, a ground, and a conductor connecting both said conductor means to said ground.

5. In a system for discharging hazardous electrical charges collected by materials and the adjacent structural portions of a building such as a barn, an adjustable conductor means adapted to electrically contact a stack of material such as hay within the building, a ground, and a conductor electrically connecting said means with said ground, apron conductor means connected to said ground and interposed within a doorway of the building, said apron means being adapted to electrically contact a load being carried into the building.

6. In a system as defined in claim 5, a feed chute, a conductor means associated with said feed chute and connecting it to said ground.

7. In a system for protecting a building such as a barn from hazardous electrical charges collected by materials in the building and structural portions thereof, a feed bin and a chute means therefor, a conductor means associated with said first-mentioned means, and being mounted in such a manner as to make electric contact with feed material portions carried by said first-mentioned means, a "natural" body of water providing a low potential ground, and means electrically connecting said conductor means to said ground.

8. In a system as defined in claim 7, an electrical conductor apron depending in a path of movement of feed discharged from the feed portion of said first-mentioned means.

JAMES S. STEELE, Jr.